(12) United States Patent
Liao et al.

(10) Patent No.: US 11,323,430 B2
(45) Date of Patent: May 3, 2022

(54) IDENTITY VERIFICATION METHOD AND DEVICE AND ELECTRONIC DEVICE

(71) Applicant: ADVANCED NEW TECHNOLOGIES CO., LTD., Grand Cayman (KY)

(72) Inventors: Hui Liao, Hangzhou (CN); Jing Li, Hangzhou (CN); Fan Zhou, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/892,902

(22) Filed: Jun. 4, 2020

(65) Prior Publication Data

US 2020/0304490 A1 Sep. 24, 2020

Related U.S. Application Data

(63) Continuation of application No. PCT/CN2019/074090, filed on Jan. 31, 2019.

(30) Foreign Application Priority Data

Mar. 21, 2018 (CN) .......................... 201810234267.5

(51) Int. Cl.
*H04L 29/06* (2006.01)
*G06K 7/14* (2006.01)
(Continued)

(52) U.S. Cl.
CPC ........ *H04L 63/0807* (2013.01); *G06K 7/1408* (2013.01); *G07C 9/00571* (2013.01);
(Continued)

(58) Field of Classification Search
CPC ............. H04L 63/0807; H04L 63/0861; H04L 63/0884; G06K 7/1408; G07C 9/00571; H04W 12/06
See application file for complete search history.

(56) References Cited

U.S. PATENT DOCUMENTS 5,979,754 A 11/1999 Martin
9,396,599 B1 * 7/2016 Malhotra ................. G07C 9/27
(Continued)

FOREIGN PATENT DOCUMENTS

CN 103888265 A 6/2014
CN 103971435 A 8/2014
(Continued)

OTHER PUBLICATIONS

Google Translation of CN105635174 (Year: 2016).*
(Continued)

*Primary Examiner* — Luu T Pham
*Assistant Examiner* — James J Wilcox (57) ABSTRACT

Methods, systems, and apparatus, including computer programs encoded on computer storage media, for identity verification are provided. One of methods, implemented by a mobile terminal device, includes: obtaining a device identifier of a service device configured to provide a service based on a digital key; uploading the device identifier to a server in communication with the service device and the mobile terminal device and storing registration information of service devices, to cause the server to perform validity verification on the device identifier; in response to receiving a result indicating the device identifier is valid, collecting identity feature information of a user; uploading the identity feature information of the user to the server, to cause the server to perform identity verification on the user based on the identity feature information; and obtaining the digital
(Continued)

key issued by the server in response to the identity verification being successful.

17 Claims, 4 Drawing Sheets

(51) Int. Cl.
  *G07C 9/00* (2020.01)
  *H04W 12/06* (2021.01)

(52) U.S. Cl.
  CPC ...... *H04L 63/0861* (2013.01); *H04L 63/0876* (2013.01); *H04L 63/0884* (2013.01); *H04W 12/06* (2013.01)

(56) References Cited

U.S. PATENT DOCUMENTS

| | | | |
|---|---|---|---|
| 9,762,581 B1 | 9/2017 | Wang et al. | |
| 9,787,673 B2* | 10/2017 | Johansson | H04L 63/0853 |
| 9,864,852 B2* | 1/2018 | Johansson | G06F 21/33 |
| 9,923,927 B1* | 3/2018 | McClintock | H04L 63/108 |
| 9,942,222 B1* | 4/2018 | Fenton | H04L 63/0853 |
| 9,955,349 B1* | 4/2018 | McClintock | H04W 12/068 |
| 10,049,202 B1* | 8/2018 | Johansson | G06F 3/04817 |
| 10,050,787 B1* | 8/2018 | Johansson | G06F 21/57 |
| 10,057,227 B1* | 8/2018 | Hess | H04L 63/0853 |
| 10,135,813 B2* | 11/2018 | Johansson | H04L 63/0838 |
| 10,356,069 B2* | 7/2019 | Johansson | H04L 9/3234 |
| 2004/0267946 A1* | 12/2004 | Caplin | G06F 21/34 709/229 |
| 2005/0221799 A1* | 10/2005 | Tervo | G06F 21/88 455/411 |
| 2007/0206838 A1 | 9/2007 | Fouquet | |
| 2007/0214492 A1* | 9/2007 | Gopi | H04M 1/72522 726/2 |
| 2009/0256676 A1* | 10/2009 | Piccirillo | G07C 9/00309 340/5.65 |
| 2011/0291798 A1 | 12/2011 | Schibuk | |
| 2012/0169460 A1 | 7/2012 | Thumparthy | |
| 2012/0313752 A1* | 12/2012 | Piccirillo | E05B 67/00 340/5.65 |
| 2013/0198836 A1 | 8/2013 | Wuellner et al. | |
| 2013/0342314 A1* | 12/2013 | Chen | G07C 9/00309 340/5.65 |
| 2014/0297538 A1* | 10/2014 | Pereira | G06Q 20/322 705/67 |
| 2014/0304162 A1* | 10/2014 | Pereira | G06Q 20/40 705/44 |
| 2014/0365373 A1* | 12/2014 | Pelegero | G06Q 20/3223 705/44 |
| 2015/0127712 A1 | 5/2015 | Fadell et al. | |
| 2015/0363989 A1 | 12/2015 | Scalisi | |
| 2016/0042581 A1 | 2/2016 | Ku | |
| 2016/0217637 A1 | 7/2016 | Gengler et al. | |
| 2016/0224776 A1 | 8/2016 | Leow | |
| 2016/0260271 A1* | 9/2016 | Belhadia | G06F 21/35 |
| 2016/0300411 A1 | 10/2016 | Isaacson | |
| 2016/0330183 A1* | 11/2016 | McDowell | H04L 63/105 |
| 2016/0350988 A1* | 12/2016 | Malhotra | H04W 12/08 |
| 2016/0368455 A1* | 12/2016 | Kim | B60R 25/25 |
| 2017/0011573 A1* | 1/2017 | Belhadia | G07C 9/00563 |
| 2017/0053467 A1* | 2/2017 | Meganck | G07C 9/00563 |
| 2017/0076082 A1* | 3/2017 | Arber | G06F 21/6227 |
| 2017/0111174 A1* | 4/2017 | Zhang | H04L 67/02 |
| 2017/0116610 A1* | 4/2017 | Gandhi | H04L 9/3215 |
| 2017/0118198 A1* | 4/2017 | Cuff | H04L 63/0823 |
| 2017/0140136 A1* | 5/2017 | Kane | G06F 21/31 |
| 2017/0140141 A1* | 5/2017 | Yan | H04W 12/06 |
| 2017/0161976 A1* | 6/2017 | Tsou | G07C 9/33 |
| 2017/0161978 A1* | 6/2017 | Wishne | G07C 9/21 |
| 2017/0206400 A1* | 7/2017 | Tsou | G06K 9/0061 |
| 2017/0243425 A1* | 8/2017 | Meganck | G07C 9/00857 |
| 2017/0243455 A1 | 8/2017 | Johnson et al. | |
| 2017/0250972 A1* | 8/2017 | Ronda | H04L 9/3236 |
| 2017/0279801 A1* | 9/2017 | Andrade | H04L 63/08 |
| 2017/0287247 A1 | 10/2017 | Saeedi et al. | |
| 2017/0295177 A1* | 10/2017 | Huang | H04L 63/0861 |
| 2017/0300679 A1* | 10/2017 | Jaeh | G06F 21/32 |
| 2017/0302663 A1* | 10/2017 | Nainar | H04W 4/70 |
| 2017/0330165 A1* | 11/2017 | Banerjee | H04L 63/107 |
| 2017/0339141 A1* | 11/2017 | Doyle | G06F 16/00 |
| 2018/0013565 A1* | 1/2018 | Fox | H04L 9/0643 |
| 2018/0018452 A1* | 1/2018 | Lee | G06F 21/34 |
| 2018/0039819 A1* | 2/2018 | Jiang | G06K 9/00067 |
| 2018/0040182 A1* | 2/2018 | Malhotra | G07C 9/00309 |
| 2018/0041492 A1* | 2/2018 | Jacobs | H04L 63/0876 |
| 2018/0041518 A1* | 2/2018 | Jacobs | H04W 4/21 |
| 2018/0046789 A1* | 2/2018 | Vissa | G06F 21/316 |
| 2018/0053184 A1* | 2/2018 | Casey | G06Q 20/409 |
| 2018/0063119 A1* | 3/2018 | Gullicksen | G06F 21/10 |
| 2018/0068173 A1* | 3/2018 | Kolleri | G06F 16/29 |
| 2018/0102009 A1* | 4/2018 | Belhadia | G07C 9/25 |
| 2018/0107816 A1* | 4/2018 | Wu | G06F 21/32 |
| 2018/0121919 A1* | 5/2018 | Song | G06Q 20/4014 |
| 2018/0146363 A1* | 5/2018 | Liu | H04W 8/18 |
| 2018/0150839 A1* | 5/2018 | Gauld | G06Q 20/4014 |
| 2018/0165686 A1* | 6/2018 | Bacon | G06F 21/6245 |
| 2018/0176021 A1* | 6/2018 | Dooley | G06F 21/44 |
| 2018/0183599 A1* | 6/2018 | Fox | H04L 9/0643 |
| 2018/0197547 A1* | 7/2018 | Shi | G06F 17/17 |
| 2018/0205718 A1* | 7/2018 | Moran | H04L 63/083 |
| 2018/0260522 A1* | 9/2018 | Bitter | G16B 50/00 |
| 2018/0262471 A1* | 9/2018 | Pereira | G06Q 20/20 |
| 2018/0351747 A1* | 12/2018 | Spangemacher | H04L 63/08 |
| 2018/0359244 A1* | 12/2018 | Cockerill | H04L 63/1441 |
| 2019/0020476 A1* | 1/2019 | Kats | G06F 21/40 |
| 2019/0066114 A1 | 2/2019 | Ross | |
| 2019/0068367 A1* | 2/2019 | Baughman | G06F 21/32 |
| 2019/0114854 A1* | 4/2019 | Dai | G07C 9/00174 |
| 2019/0190718 A1* | 6/2019 | Wease | H04L 9/3247 |
| 2019/0207975 A1* | 7/2019 | Wardman | H04L 51/046 |
| 2019/0363885 A1* | 11/2019 | Schiavoni | H04L 63/0884 |
| 2019/0363886 A1* | 11/2019 | Atwood | H04W 12/06 |
| 2020/0048933 A1* | 2/2020 | Li | E05B 47/0002 |
| 2021/0097159 A1* | 4/2021 | Wang | G10L 17/18 |
| 2021/0097795 A1* | 4/2021 | Manchovski | H04L 9/088 |
| 2021/0144247 A1* | 5/2021 | Sun | H04L 63/08 |

FOREIGN PATENT DOCUMENTS

| | | | |
|---|---|---|---|
| CN | 104424678 | A | 3/2015 |
| CN | 104753898 | A | 7/2015 |
| CN | 105553928 | A | 5/2016 |
| CN | 105635174 | A * | 6/2016 |
| CN | 105635174 | A | 6/2016 |
| CN | 105654592 | A | 6/2016 |
| CN | 103971435 | B | 7/2016 |
| CN | 105871874 | A | 8/2016 |
| CN | 105913132 | A | 8/2016 |
| CN | 106296917 | A | 1/2017 |
| CN | 106335572 | A | 1/2017 |
| CN | 106656952 | A | 5/2017 |
| CN | 103888265 | B | 7/2017 |
| CN | 107151415 | A | 9/2017 |
| CN | 107154115 | A | 9/2017 |
| CN | 107493561 | A | 12/2017 |
| CN | 108564688 | A | 9/2018 |
| JP | H09322246 | A | 12/1997 |
| JP | 3261394 | B2 | 2/2002 |

OTHER PUBLICATIONS

Google Patents Translation of CN 105635174 (Year: 2016).*
Secure Technology Alliance "Mobile Identity Authentication," A Secure Technology Alliance Mobile Councel White Paper, Version 1.0, Mar. 2017, pp. 1-39 (Year: 2017).*
Fuller et al ("Security Analysis of the August Smart Lock," Massachusetts Institute of Technology, May 24, 2017, pp. 1-17) (Year: 2017).*

(56) References Cited

OTHER PUBLICATIONS

Paci et al "An Interoperable Approach to Multifactor Identity Verification," Cerias and CS Department Purdue University, IEEE Computer Society, pp. 50-57, May 2009 (Year: 2009).*
International Search Report and Written Opinion for Application No. PCT/CN2019/074090, dated Apr. 28, 2019, 10 pages.
First Search and First Office Action for CN Application No. 201810234267.5 dated Feb. 5, 2020 (13 pages).
Supplemental Search Report and Second office action for CN Application No. 201810234267.5 dated May 7, 2020 (12 pages).
Third Office Action for CN Application No. 201810234267.5 dated Jul. 20, 2020 (10 pages).
Search Report for TW Application No. 108100521 dated Jun. 11, 2020 (2 pages).
Search Report for European Application No. 19 771 488.4 dated Oct. 20, 2020.
Othman Asem et al., "The Horcrux Protocol: A Method for Decentralized Biometric-based Self-sovereign Identity," 2018 IJCNN, IEEE, Jul. 13, 2018.
Abbie Barbir Aetna USA, Updated text for X.dlt-sec, "Security considerations for using DLT data in Identity Mangement; C-0471", ITU-T DRAFT; International Telecommunication Union, Jan. 3, 2019.
Search Report for European Application No. 19771488.4 dated Nov. 24, 2020.
Supplementary Search for Chinese Application No. 201810234267.5 dated Apr. 6, 2021.
Written Opinion for Singaporean Application No. 11202006204T dated Jul. 27, 2021.

* cited by examiner

IDENTITY VERIFICATION METHOD AND DEVICE AND ELECTRONIC DEVICE

CROSS REFERENCE TO RELATED APPLICATION

The present application is a continuation application of International Patent Application No. PCT/CN2019/074090, filed on Jan. 31, 2019, and entitled "Identity Verification Method and Device and Electronic Device," which claims priority to and is based on the Chinese Patent Application No. 201810234267.5, filed on Mar. 21, 2018. All of the above-referenced applications are incorporated herein by reference in their entirety.

TECHNICAL FIELD

The application relates to the technical field of the Internet, and in particular, to a method, an apparatus, and an electronic device for identity verification.

BACKGROUND

Along with the continuous development of the Internet, there are more and more scenarios in which digital passes or digital keys are realized through mobile terminal devices, such as mobile payment, hotel check-in, punch-in at work, smart locks, and the like.

Taking a smart lock as an example, a user may use a mobile terminal device to open the smart lock. For example, the smart lock needs to verify the identity of the user. Only after the identity verification is successful, can the mobile terminal device obtain a digital pass or a digital key to open the smart lock. In other words, before the mobile terminal device obtains a digital pass or a digital key, a service device such as a smart lock needs to verify the identity of the user. It can be seen that, since the service device needs to perform identity verification, the service device needs to have some software and/or hardware requirements. For example, when face recognition is used to perform identity verification, the service device needs to have some computation capabilities in software and have a camera in hardware.

An identity verification solution applicable to a device that does not have high performance requirements needs to be provided.

SUMMARY

Embodiments of the application provide a method, an apparatus, and a non-transitory computer-readable storage medium for identity verification.

According to a first aspect of the embodiments of the application, a method for identity verification is provided. The method may be applied on a mobile terminal device and comprise: obtaining, from a service device, a device identifier of the service device, wherein the service device is configured to provide a service based on a digital key; uploading the device identifier of the service device to a server that is in communication with the service device and the mobile terminal device and stores registration information of service devices, to cause the server to perform validity verification on the device identifier of the service device; in response to receiving a result of the validity verification from the server indicating the device identifier of the service device is valid, collecting identity feature information of a user that is to obtain the service from the service device; uploading the identity feature information of the user to the server, to cause the server to perform identity verification on the user based on the identity feature information; and obtaining the digital key issued by the server in response to the identity verification being successful, wherein the digital key is configured to be used by the user to obtain the service provided by the service device.

In some embodiments, obtaining, from a service device, a device identifier of the service device comprises: establishing short-range wireless communication with the service device to obtain the device identifier transmitted by the service device.

In some embodiments, the short-range wireless communication comprises Bluetooth communication, infrared communication, wireless local area network, WI-FI, Ultra-Wide Band communication, Zigbee communication, or near-field communication.

In some embodiments, obtaining, from a service device, a device identifier of the service device comprises: scanning a graphic code provided by the service device to obtain the device identifier of the service device.

In some embodiments, the identity feature information comprises biometric information. In some embodiments, the biometric information comprises a fingerprint, a palmprint, an iris, an eyeprint, a face, a sound wave, a brain wave, or a combination thereof.

In some embodiments, the device identifier comprises a static device identifier and/or a dynamic device identifier. In some embodiments, the dynamic device identifier comprises a dynamic token.

According to a second aspect of the embodiments of the application, an apparatus for identity verification is provided. The apparatus may comprise: one or more processors and one or more non-transitory computer-readable memories coupled to the one or more processors and configured with instructions executable by the one or more processors to cause the apparatus to perform operations comprising: obtaining, from a service device, a device identifier of the service device, wherein the service device is configured to provide a service based on a digital key; uploading the device identifier of the service device to a server that is in communication with the service device and the mobile terminal device and stores registration information of service devices, to cause the server to perform validity verification on the device identifier of the service device; in response to receiving a result of the validity verification from the server indicating the device identifier of the service device is valid, collecting identity feature information of a user that is to obtain the service from the service device; uploading the identity feature information of the user to the server, to cause the server to perform identity verification on the user based on the identity feature information; and obtaining the digital key issued by the server in response to the identity verification being successful, wherein the digital key is configured to be used by the user to obtain the service provided by the service device.

According to a third aspect of the embodiments of the application, a non-transitory computer-readable storage medium is provided. The non-transitory computer-readable storage medium may be configured with instructions executable by one or more processors to cause the one or more processors to perform operations comprising: obtaining, from a service device, a device identifier of the service device, wherein the service device is configured to provide a service based on a digital key; uploading the device identifier of the service device to a server that is in communication with the service device and the mobile terminal device and stores registration information of service devices, to cause the server to perform validity verification on the device identifier of the service device; in response to receiving a result of the validity verification from the server indicating the device identifier of the service device is valid, collecting identity feature information of a user that is to obtain the service from the service device; uploading the identity feature information of the user to the server, to cause the server to perform identity verification on the user based on the identity feature information; and obtaining the digital key issued by the server in response to the identity verification being successful, wherein the digital key is configured to be used by the user to obtain the service provided by the service device.

According to the embodiments of the application, identity verification that has been originally performed by a device is now performed by a server, which may lower software and hardware requirements of the device, and the embodiments may then also be applicable to a device that does not have high performance.

DETAILED DESCRIPTION

Embodiments will be described in detail below, and the embodiments are illustrated in the accompanying drawings. When the description below involves the accompanying drawings, identical numbers in different drawings represent identical or similar elements, unless otherwise indicated. The implementation manners described in the following embodiments do not represent all implementation manners consistent with the application. Conversely, they are merely examples of devices and methods consistent with some aspects of the application as described in detail in the appended claims.

Terms used in the application aim at describing embodiments, rather than limiting the application. "A," "the," and "said" in the singular form used in the application and the appended claims are intended to include the plural forms as well, unless clearly indicated in the context to have other meanings. It should also be understood that the term "and/or" used herein refers to and includes any or all possible combinations of one or more associated listed items.

It should be understood that terms such as first, second, third, etc. may be used in the application to describe various information, but the information shall not be limited to these terms. These terms are used to differentiate information of the same type from another. For example, without departing from the scope of the application, first information may also be referred to as second information, and similarly, second information may also be referred to as first information. Depending on the context, the term "if" used herein may be construed as "when . . . " or "at the time of . . . " or "in response to determining."

Figure 1:
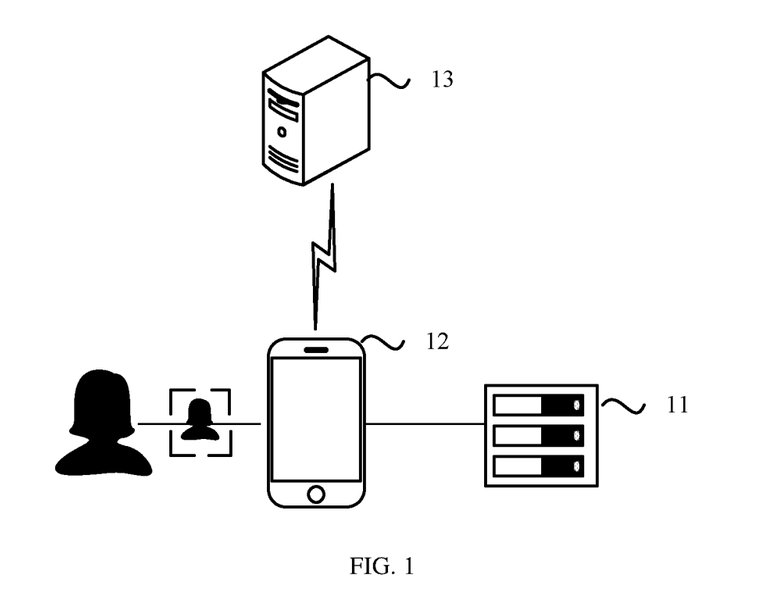
FIG. 1 is a concept diagram of an architecture of a system for realizing identity verification according to some embodiments of the application.

As described above, on the one hand, since some devices for providing services based on digital passes or keys are required to perform identity verification, the devices need to meet some software and/or hardware requirements. For example, when face recognition is used to perform identity verification, the devices are required to have some computation capabilities in software and have a camera in hardware. On the other hand, there may be strict energy consumption requirements when the devices are designed, such as low power devices powered by batteries. These devices generally adopt low power modules, and thus cannot meet the demand for long-term complex computation. Taking smart locks as an example again, smart locks are generally powered by batteries, and low power modules are adopted to achieve long-term use. Therefore, current smart locks may not meet the computation capability requirements to perform the needed identity verification The application may involve one or more systems. Referring to FIG. 1, a concept diagram of an example architecture of a system applicable in the application is illustrated, and the concept diagram of the architecture of the system may comprise a device 11 that is able to provide a service based on a digital key (or pass) (the two terms are interchangeably used in the specification), a mobile terminal device 12, and a server 13.

The device 11 that is able to provide a service based on a digital pass or key may refer to a device for which a digital pass or a digital key is required. The device 11 may be various devices in various scenarios. For example, in the scenario of hotel check-in, the device 11 may be a self-service terminal device for check-in, and in the scenario of opening a lock, the device 11 may be a smart lock.

The mobile terminal device 12 may refer to a client device used by a user and installed with an application. For example, the mobile terminal device may be a mobile phone installed with an application (APP).

The digital key may also be referred to as a digital pass hereinafter. A digital key or digital pass may be code, a password, a Quick Response (QR) code, or an application (APP) operating on the mobile terminal device 11 to enable a user to obtain the service provided by the device 11. For example, a digital key or pass may be an APP operating on a mobile phone to open a smart lock.

The server 13 may refer to an application server, a server cluster, or a cloud platform constructed based on a server cluster, in communication with the device 11 and the mobile terminal device 12. The server 13 may implement identity verification. For example, the server 13 is configured to verify identities of the users that are to obtain the service from the device 11.

In some embodiments, when a user is to obtain a service provided by the device 11, the mobile terminal device 12 may obtain a device identifier of the device 11. The mobile terminal device 12 may collect identity feature information of the user, which is to be verified by the server 13, and send the identity feature information of the user to the server 13. Ultimately, the mobile terminal device 12 may obtain a digital pass issued by the server 13 in response to identity of the user being verified successfully. Then, the mobile terminal device 12 may be used by the user to obtain the service provided by the device 11 based on the digital pass.

Figure 2:
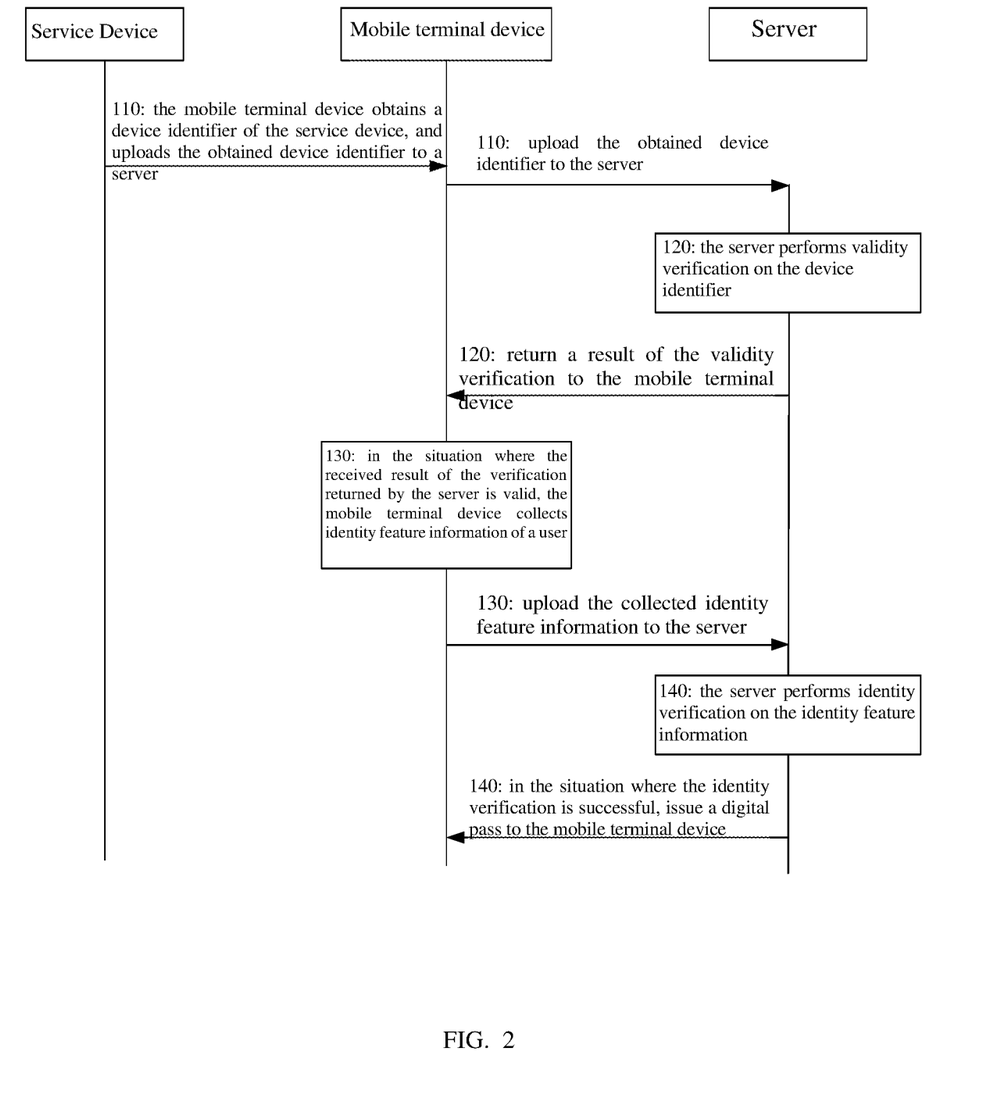
FIG. 2 is a flow chart of a method for identity verification according to some embodiments of the application.

Embodiments of a method for identity verification according to the application will be described below with reference to FIG. 2. As shown in FIG. 2, the method may comprise the following steps.

In Step 110, a mobile terminal device obtains a device identifier of a service device for providing a service to a user based on a digital key, and uploads the obtained device identifier to the server.

The service device may be referred to as the device in some occasions hereinafter for conciseness. In some embodiments, the device identifier comprises a static device identifier and/or a dynamic device identifier.

Taking a static device identifier as an example, the device identifier is unique, i.e., each device may correspond to one unique device identifier, such as a device serial number, a device identification (ID), and the like when the device leaves the factory.

Taking a dynamic device identifier as an example, the device identifier may comprise a dynamic token. The dynamic token may refer to an encrypted character string, which may be generated by a preset algorithm. Generally, the dynamic token changes dynamically. For example, the dynamic token obtained by the mobile terminal device each time is different, or the device periodically generates a new token.

In some embodiments, the mobile terminal device obtaining a device identifier of a device comprises: the mobile terminal device obtaining, by establishing short-range wireless communication with the device, a device identifier transmitted by the device. For example, the mobile terminal device establishes short-range wireless communication with the device, and the device transmits its device identifier to the mobile terminal device.

For example, the short-range wireless communication comprises one of Bluetooth communication, infrared communication, wireless local area network, WI-FI, Ultra-Wide Band communication, Zigbee communication, and near-field communication.

In some embodiments, a module applicable for short-range wireless communication may be integrated in the device, for example, a Bluetooth module, an infrared (IrDA) module, a wireless local area network (WI-FI or WLAN, mostly adopting the 802.11-series protocols) module, a WI-FI Direct module, a Ultra-Wide Band module, a Zigbee module, and a near-field communication (NFC) module, so as to achieve short-range receiving and transmitting of wireless signals. Similarly, the same module applicable for short-range wireless communication may also be integrated in the mobile terminal device.

In some embodiments, the Bluetooth technology is taken as an example for description.

As a short-range wireless communication technology for replacing data cables, the Bluetooth technology can support point to point and point to multi-point communications, thereby achieving fast and convenient information exchange between devices.

A device may transmit, via a Bluetooth module, a broadcasting signal containing its own identifier (e.g., Universally Unique Identifier (UUID)). According to the Bluetooth technology, the Bluetooth module may be identified through the Universally Unique Identifier (UUID). Each UUID temporally and spatially ensures the uniqueness of a Bluetooth service. A UUID may be, for example, in a short form (16 or 32 bits) or a long form (128 bits). A UUID may be transmitted via a Bluetooth broadcasting signal.

In some embodiments, the Bluetooth Low Energy (BLE) technology may be adopted as the Bluetooth technology. For example, the iBeacon technology may be adopted. The iBeacon technology is a technology developed based on BLE with characteristics of low cost, extensive expansion, and flexible customization. The iBeacon technology may enable a smart phone or other devices to execute corresponding commands within a sensing range of an iBeacon base station. For example, a payment collection device may be an iBeacon base station. iBeacon has been provided on the OS for mobile devices (iOS7) released by Apple, Inc. in September 2013.

There may be two BLE communication manners: advertising and connecting. Advertising is a one-way sending mechanism and one of the broadcasting modes. A device to be searched (e.g., an iBeacon base station, a payment collection device) may send a data packet at a time interval of 20 ms to 10 s. A battery is consumed faster when a shorter time interval is used, and it is faster to find the device. The data packet length is at most 47 bytes, which may include the following parts:

1 byte: preamble (1 byte for the preamble)
4 bytes: access address (4 bytes for address)
39 bytes: advertising channel PDU (39 bytes for PDU data packet)
3 bytes: CRC (3 bytes for CRC data check)

A BLE device may operate in a single and non-connectable advertising mode (in this mode, all information is included in an advertising data packet); in addition, a BLE device may also operate in a connectable mode (i.e., the connecting mode).

In some embodiments, the device for providing a service based on a digital pass or key may operate in a single and non-connectable advertising mode. In this way, the device may send out its own device identifier in the advertising mode. For example, the device identifier of the device may be carried in the above-described PDU data packet.

The mobile terminal device may find the UUID of the device for providing a service based on a digital pass or key by scanning Bluetooth signals being broadcast. For example, an application installed on the mobile terminal device may drive the mobile terminal device to scan wireless signals by calling a low level Application Programming Interface (API). Then, a wireless signal sent by the device, e.g., a Bluetooth signal sent in the advertising mode, may be scanned. Since the Bluetooth signal sent by the device includes its own device identifier information, e.g., a UUID, the mobile terminal device may find this UUID from the scanned Bluetooth broadcasting signal.

In some embodiments, the mobile terminal device obtaining a device identifier of a device comprises: the mobile terminal device obtaining, by scanning a graphic code provided by the device, a device identifier of the device.

For example, the device may display a graphic code including a device identifier. A module for scanning graphic codes, such as a camera, a code scanner, and the like, may be integrated in the mobile terminal device, so as to scan the graphic code to obtain the device identifier.

In some embodiments, the camera is taken as an example for description.

The mobile terminal device may turn on the camera. When the camera collects an image of the graphic code, the device identifier included in the graphic code may be obtained through analysis by local analysis software on the mobile terminal device or a remote server.

In some embodiments, the graphic code may comprise a QR code, a barcode, and the like.

In Step 120, the server performs validity verification on the device identifier, and returns a result of the validity verification to the mobile terminal device.

In some embodiments, the server performing validity verification on the device identifier may comprise: determining whether the device corresponding to the device identifier has been registered on the server; in the situation where the device corresponding to the device identifier has been registered on the server, determining that the result of the verification is valid.

In some embodiments, the manufacturer of the device may complete the registration on the server when the device leaves the factory. As a result, the server may store a correspondence relationship between the device identifier and the device and also have a record of registration.

In some embodiments, for a dynamic device identifier, the server may have the same algorithm as the algorithm on the device for generating a dynamic token. Through the algorithm, the server may verify whether a dynamic token uploaded by the mobile terminal device is correct. In the situation where the dynamic token is correct, the server determines that the result of the verification is valid.

After the server determines the result of the verification, the server may return the result of the verification to the mobile terminal device.

In Step 130, in the situation where the received result of the verification returned by the server is valid, the mobile terminal device collects identity feature information of a user, and uploads the collected identity feature information to the server.

In some embodiments, the identity feature information may comprise biometric information of the user. The biometric information comprises a fingerprint, a palmprint, an iris, an eyeprint, a face, a sound wave, a brain wave, or a combination thereof. Correspondingly, a module for collecting biometric information may be integrated in the mobile terminal device. For example, a user's face image may be collected through a camera, a user's fingerprint may be collected through a fingerprint module, a user's sound wave information may be collected through a sound wave module, and the like.

In some embodiments, the identity feature information may also comprise password information input by a user.

In Step 140, the server performs identity verification on the identity feature information, and in the situation where the verification is successful, issues a digital pass to the mobile terminal device, wherein the digital pass is used to obtain a service provided by the device.

In some embodiments, the server may store identity feature information pre-stored by the user. Upon receiving the identity feature information uploaded by the mobile terminal device, the server may compare the identity feature information with the pre-stored identity feature information. If the identity feature information is consistent with the pre-stored identity feature information, it indicates that the current user is the user himself or herself; otherwise, it indicates that the current user is not the user himself or herself.

In the situation where the verification is successful, the server may issue a digital pass to the mobile terminal device. The digital pass may be approved by the device, and the mobile terminal device may use the digital pass to obtain a service provided by the device.

Taking a smart lock scenario as an example, after the mobile terminal device obtains the digital pass, the mobile terminal device may open the smart lock by using the digital pass.

Taking a hotel check-in scenario as an example, after the mobile terminal device obtains the digital pass, the mobile terminal device may complete check-in by using the digital pass.

According to the embodiments of the application, identity verification that has been originally performed by a device is now performed by a server, which may lower software and hardware requirements of the device and the embodiments may then also be applicable to a device that does not have high performance. On the other hand, whether the current user is the user himself or herself may be determined through the identity verification, which prevents impersonation and improves the reliability.

In some embodiments, the mobile terminal device using the digital pass may be as follows. The mobile terminal device sends the digital pass to the device, which may, referring to Step 110, be implemented based on short-range wireless communication. Then, the device may locally perform validation on the digital pass and provide services after the validation is successful. Alternatively, the device may upload the digital pass to the server for the server to validate the digital pass, and the services may be provided when a result of the validation returned by the server is valid.

Figure 3:
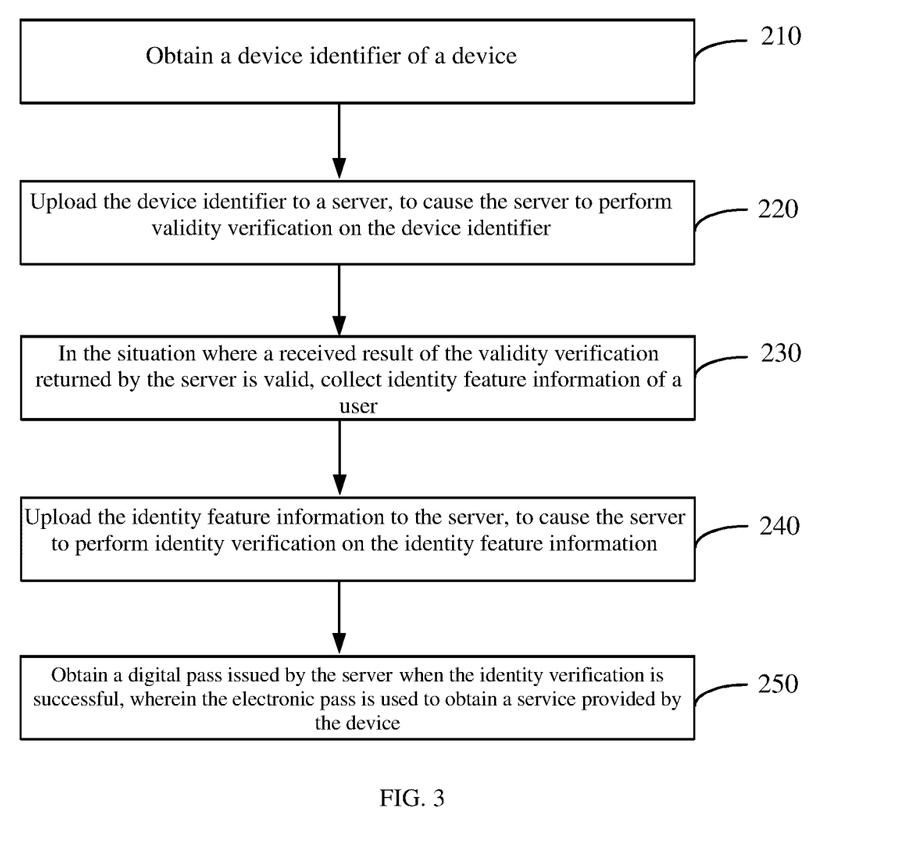
FIG. 3 is a flow chart of another method for identity verification according to some embodiments of the application.

Method embodiments with a mobile terminal device as the executing entity according to the application are described below with reference to FIG. 3. The embodiments may also correspond to FIG. 2.

In Step 210, obtaining a device identifier of a device;

In Step 220, uploading the device identifier to a server, to cause the server to perform validity verification on the device identifier;

In Step 230, in the situation where a received result of the verification returned by the server is valid, collecting identity feature information of a user;

In Step 240, uploading the identity feature information to the server, to cause the server to perform identity verification on the identity feature information; and In Step 250, obtaining a digital pass issued by the server when the identity verification is successful, wherein the digital pass is used to obtain a service provided by the device.

In some embodiments, the obtaining a device identifier of a device may comprise: obtaining, by establishing short-range wireless communication with the device, the device identifier transmitted by the device; or, obtaining, by scanning a graphic code provided by the device, the device identifier of the device.

In some embodiments, the short-range wireless communication comprises Bluetooth communication, infrared communication, wireless local area network, WI-FI, Ultra-Wide Band communication, Zigbee communication, or near-field communication.

In some embodiments, the identity feature information comprises biometric information.

In some embodiments, the biometric information comprises a fingerprint, a palmprint, an iris, an eyeprint, a face, a sound wave, a brain wave, or a combination thereof.

In some embodiments, the device identifier comprises a static device identifier and/or a dynamic device identifier.

In some embodiments, the dynamic device identifier comprises a dynamic token.

Figure 4:
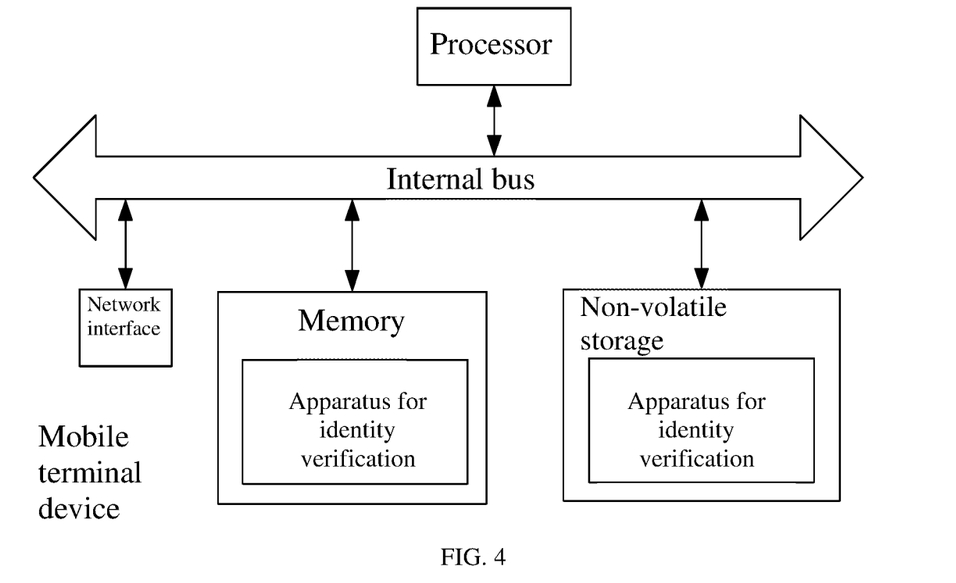
FIG. 4 is a hardware structural diagram of a device for identity verification according to some embodiments of the application.

Corresponding to the above-described method embodiments for identity verification, the application further provides embodiments of an apparatus for identity verification. The apparatus embodiments may be implemented through software, hardware, or a combination of software and hardware. Take software implementation as an example, an apparatus in the sense of logic is formed by a processor of a device where the apparatus is located reading corresponding computer program instructions from a non-volatile storage into the memory. From the perspective of the hardware layer, a hardware structure of a device where the apparatus for identity verification is located according to the application may, as shown in FIG. 4, comprise a processor, a network interface, a memory, and a non-volatile storage. In addition, the device where the apparatus is located may further comprise other hardware according to the function of the identity verification, which will not be elaborated herein.

Figure 5:
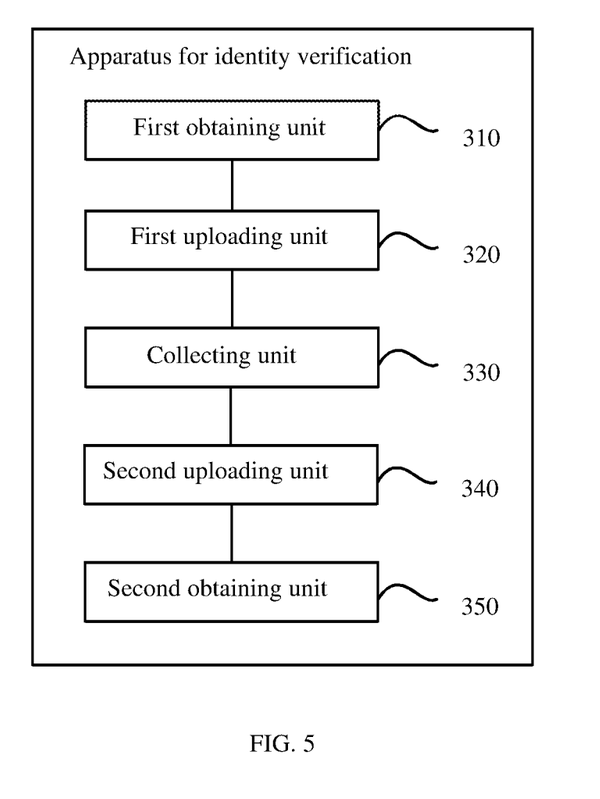
FIG. 5 is a schematic diagram of modules of an apparatus for identity verification according to some embodiments of the application.

FIG. 5 is a schematic diagram of modules of an apparatus for identity verification according to some embodiments of the application. The apparatus comprises: a first obtaining unit 310 configured to obtain a device identifier of a device; a first uploading unit 320 configured to upload the device identifier to a server, to cause the server to perform validity verification on the device identifier; a collecting unit 330 configured to collect, in the situation where a received result of the validity verification returned by the server is valid, identity feature information of a user; a second uploading unit 340 configured to upload the identity feature information to the server, to cause the server to perform identity verification on the identity feature information; and a second obtaining unit 350 configured to obtain a digital pass issued by the server when the identity verification is successful, wherein the digital pass is used to obtain a service provided by the device.

In some embodiments, the first obtaining unit 310 may comprise a first obtaining sub-unit configured to obtain, by establishing short-range wireless communication with the device, a device identifier transmitted by the device. Alternatively, the first obtaining unit 310 may comprise a second obtaining sub-unit configured to obtain, by scanning a graphic code provided by the device, a device identifier of the device.

In some embodiments, the short-range wireless communication comprises Bluetooth communication, infrared communication, wireless local area network, WI-FI, Ultra-Wide Band communication, Zigbee communication, or near-field communication.

In some embodiments, the identity feature information comprises biometric information.

In some embodiments, the biometric information comprises a fingerprint, a palmprint, an iris, an eyeprint, a face, a sound wave, a brain wave, or a combination thereof.

In some embodiments, the device identifier comprises a static device identifier and/or a dynamic device identifier.

In some embodiments, In some embodiments, the dynamic device identifier comprises a dynamic token.

The system, apparatus, module, or unit elaborated in the embodiments can, for example, be achieved by a computer chip or entity or by a product having a function. One implementation device is a computer, and examples of the computer can include a personal computer, a laptop computer, a cellular telephone, a camera phone, a smart phone, a personal digital assistant, a media player, a navigation device, an email receiving and transmitting device, a game console, a tablet computer, a wearable device, or a combination of any of the above devices.

For detailed implementation processes of functions and roles of the units in the above-described apparatus, the implementation processes of corresponding steps in the above-described method may be referenced, which will not be elaborated again herein.

Since the apparatus embodiments substantially correspond to the method embodiments, the description of relevant parts of the method embodiments may be referenced for related parts of the apparatus embodiments. The above-described apparatus embodiments are merely examples, wherein the units described as separate parts may or may not be physically separated. Parts displayed as units may or may not be physical units, i.e., may be located at one place or may be distributed over a plurality of network units. Some or all of the modules can be selected according to actual needs to achieve the objectives of the application. One of ordinary skill in the art can understand and implement the embodiments of the application without creative effort.

FIG. 5 schematically describes internal functional modules and structure of the apparatus for identity verification above, and the essential executing entity of the apparatus may be an electronic device, comprising: a processor; and a memory configured to store instructions executable by the processor, wherein the instructions, when executed by the processor, cause the device to perform the following operations: obtaining a device identifier of a device; uploading the device identifier to a server, to cause the server to perform validity verification on the device identifier; in the situation where a received result of the validity verification returned by the server is valid, collecting identity feature information of a user; uploading the identity feature information to the server, to cause the server to perform identity verification on the identity feature information; and obtaining a digital pass issued by the server when the identity verification is successful, wherein the digital pass is used to obtain a service provided by the device.

In some embodiments, the obtaining a device identifier of a device may, for example, comprise: obtaining, by establishing short-range wireless communication with the device, the device identifier transmitted by the device; or, obtaining, by scanning a graphic code provided by the device, the device identifier of the device.

In some embodiments, the short-range wireless communication comprises Bluetooth communication, infrared communication, wireless local area network, WI-FI, Ultra-Wide Band communication, Zigbee communication, or near-field communication.

In some embodiments, the identity feature information comprises biometric information.

In some embodiments, the biometric information comprises a fingerprint, a palmprint, an iris, an eyeprint, a face, a sound wave, a brain wave, or a combination thereof.

In some embodiments, the device identifier comprises a static device identifier and/or a dynamic device identifier.

In some embodiments, the dynamic device identifier comprises a dynamic token.

In the above-described embodiments of the electronic device, the processor may be a Central Processing Unit (or CPU in short), or may be other general-purpose processors, digital signal processors (or DSP in short), Application Specific Integrated Circuits (or ASIC in short), and the like. The general-purpose processor may be a micro-processor, or the processor may be any conventional processor, while the above-described memory may be a read-only memory (or ROM in abbreviation), a random access memory (or RAM in short), a flash memory, a hard drive, or a solid-state drive. Steps of the methods disclosed in combination with the embodiments of the application may be directly embodied as being executed by a hardware processor or executed by a combination of hardware and software modules in the processor.

All the embodiments in the application are described in a progressive manner, the same or similar parts between the various embodiments may refer to each other, and each embodiment focuses on the differences from the other embodiments. In particular, since the electronic device embodiments is substantially similar to the method embodiments, the electronic device embodiments are described in a relatively simple manner, and the description of relevant parts of the method embodiments may be referenced for related parts.

It will be easy for those skilled in the art to conceive, after considering the application and practicing the inventions disclosed here, of other embodiments of the application. The application intends to cover any modifications, uses, or adaptive variations of the application. These modifications, uses, or adaptive variations comply with the general principles of the application, and comprise common general knowledge or conventional technical means in the art that are not disclosed in the application. The application and embodiments may be deemed to be exemplary, and the true scope and spirit are pointed out in the claims below.

It should be understood that the application is not limited to the accurate structure described above and illustrated in the accompanying drawings, and the application may be subject to various modifications and variations without departing from the scope of the application. The scope of the application shall be limited by the appended claims.

What is claimed is:

1. A method applied on a mobile terminal device and comprising:
    obtaining, from a service device, a device identifier of the service device, wherein the service device is configured to provide a service of opening a physical lock that is powered by one or more batteries based on a digital password and operate in an advertising mode of an iBeacon technology to broadcast the device identifier, the device identifier is a character string encrypted by the service device using a preset algorithm, and obtaining the device identifier of the service device comprises:
        establishing short-range wireless communication with the service device to obtain the device identifier transmitted by the service device, wherein the short-range wireless communication comprises Bluetooth communication, infrared communication, wireless local area network, WI-FI, Ultra-Wide Band communication, Zigbee communication, or near-field communication;
    uploading the device identifier broadcasted by the service device operating in the advertising mode of the iBeacon technology to a server that is in communication with the service device and the mobile terminal device and stores registration information of service devices, to cause the server to perform validity verification according to the preset algorithm on the device identifier of the service device;
    in response to receiving a result of the validity verification from the server indicating the device identifier of the service device is valid, collecting identity feature information of a user that is to obtain the service from the service device;
    uploading the identity feature information of the user to the server, to cause the server to perform identity verification on the user based on the identity feature information;
    obtaining the digital password issued by the server in response to the identity verification being successful, wherein the digital password is configured to be used by the user to obtain the service provided by the service device; and
    sending the digital password to the service device, wherein the service device uploads the digital password to the server for the server to validate the digital password, and the service device provides the service when a result of the validation of the digital password by the server is valid.

2. The method according to claim 1, wherein the service device broadcasts the device identifier at a time interval of 5 seconds or longer.

3. The method according to claim 1, wherein obtaining, from the service device, the device identifier of the service device comprises:
    scanning a graphic code provided by the service device to obtain the device identifier of the service device.

4. The method according to claim 1, wherein the identity feature information comprises biometric information, and the biometric information comprises a fingerprint, a palmprint, an iris, an eyeprint, a face, a sound wave, a brain wave, or a combination thereof.

5. The method according to claim 1, wherein a data packet length of the device identifier is at most 47 bytes.

6. The method according to claim 1, wherein the device identifier comprises a static device identifier or a dynamic device identifier.

7. The method according to claim 6, wherein the dynamic device identifier comprises a dynamic token.

8. A mobile terminal device for identity verification, comprising: one or more processors and one or more non-transitory computer-readable memories coupled to the one or more processors and configured with instructions executable by the one or more processors to cause the apparatus to perform operations comprising:
    obtaining, from a service device, a device identifier of the service device, wherein the service device is configured to provide a service of opening a physical lock that is powered by one or more batteries based on a digital password and operate in an advertising mode of an iBeacon technology to broadcast the device identifier, the device identifier is a character string encrypted by the service device using a preset algorithm, and obtaining the device identifier of the service device comprises:
        establishing short-range wireless communication with the service device to obtain the device identifier transmitted by the service device, wherein the short-range wireless communication comprises Bluetooth communication, infrared communication, wireless local area network, WI-FI, Ultra-Wide Band communication, Zigbee communication, or near-field communication;
    uploading the device identifier broadcasted by the service device operating in the advertising mode of the iBeacon technology to a server that is in communication with the service device and the mobile terminal device and stores registration information of service devices, to cause the server to perform validity verification according to the preset algorithm on the device identifier of the service device;
    in response to receiving a result of the validity verification from the server indicating the device identifier of the service device is valid, collecting identity feature information of a user that is to obtain the service from the service device;
    uploading the identity feature information of the user to the server, to cause the server to perform identity verification on the user based on the identity feature information;

obtaining the digital password issued by the server in response to the identity verification being successful, wherein the digital password is configured to be used by the user to obtain the service provided by the service device; and sending the digital password to the service device, wherein the service device uploads the digital password to the server for the server to validate the digital password, and the service device provides the service when a result of the validation of the digital password by the server is valid.

9. The mobile terminal device according to claim 8, wherein the service device broadcasts the device identifier at a time interval of 5 seconds or longer.

10. The mobile terminal device according to claim 8, wherein obtaining, from the service device, the device identifier of the service device comprises:

scanning a graphic code provided by the service device to obtain the device identifier of the service device.

11. The mobile terminal device according to claim 8, wherein the identity feature information comprises biometric information, and the biometric information comprises a fingerprint, a palm print, an iris, an eyeprint, a face, a sound wave, a brain wave, or a combination thereof.

12. The mobile terminal device according to claim 11, wherein a data packet length of the device identifier is at most 47 bytes.

13. The mobile terminal device according to claim 8, wherein the device identifier comprises a static device identifier or a dynamic device identifier.

14. The mobile terminal device according to claim 13, wherein the dynamic device identifier comprises a dynamic token.

15. A non-transitory computer-readable storage medium configured with instructions executable by one or more processors in a mobile terminal device to cause the one or more processors to perform operations comprising:

obtaining, from a service device, a device identifier of the service device, wherein the service device is configured to provide a service of opening a physical lock that is powered by one or more batteries based on a digital password and operate in an advertising mode of an iBeacon technology to broadcast the device identifier, the device identifier is a character string encrypted by the service device using a preset algorithm, and obtaining the device identifier of the service device comprises:

establishing short-range wireless communication with the service device to obtain the device identifier transmitted by the service device, wherein the short-range wireless communication comprises Bluetooth communication, infrared communication, wireless local area network, WI-FI, Ultra-Wide Band communication, Zigbee communication, or near-field communication;

uploading the device identifier of the service device to a server that is in communication with the service device and the mobile terminal device and stores registration information of service devices, to cause the server to perform validity verification according to the preset algorithm on the device identifier of the service device;

in response to receiving a result of the validity verification from the server indicating the device identifier of the service device is valid, collecting identity feature information of a user that is to obtain the service from the service device;

uploading the identity feature information of the user to the server, to cause the server to perform identity verification on the user based on the identity feature information;

obtaining the digital password issued by the server in response to the identity verification being successful, wherein the digital password is configured to be used by the user to obtain the service provided by the service device; and sending the digital password to the service device, wherein the service device uploads the digital password to the server for the server to validate the digital password, and the service device provides the service when a result of the validation of the digital password by the server is valid.

16. The non-transitory computer-readable storage medium according to claim 15, wherein the service device broadcasts the device identifier at a time interval of 5 seconds or longer.

17. The non-transitory computer-readable storage medium according to claim 15, wherein obtaining, from the service device, the device identifier of the service device comprises:

scanning a graphic code provided by the service device to obtain the device identifier of the service device.

* * * * *